Oct. 13, 1964 W. CARLS 3,152,614
VALVE
Filed April 9, 1956 3 Sheets-Sheet 1
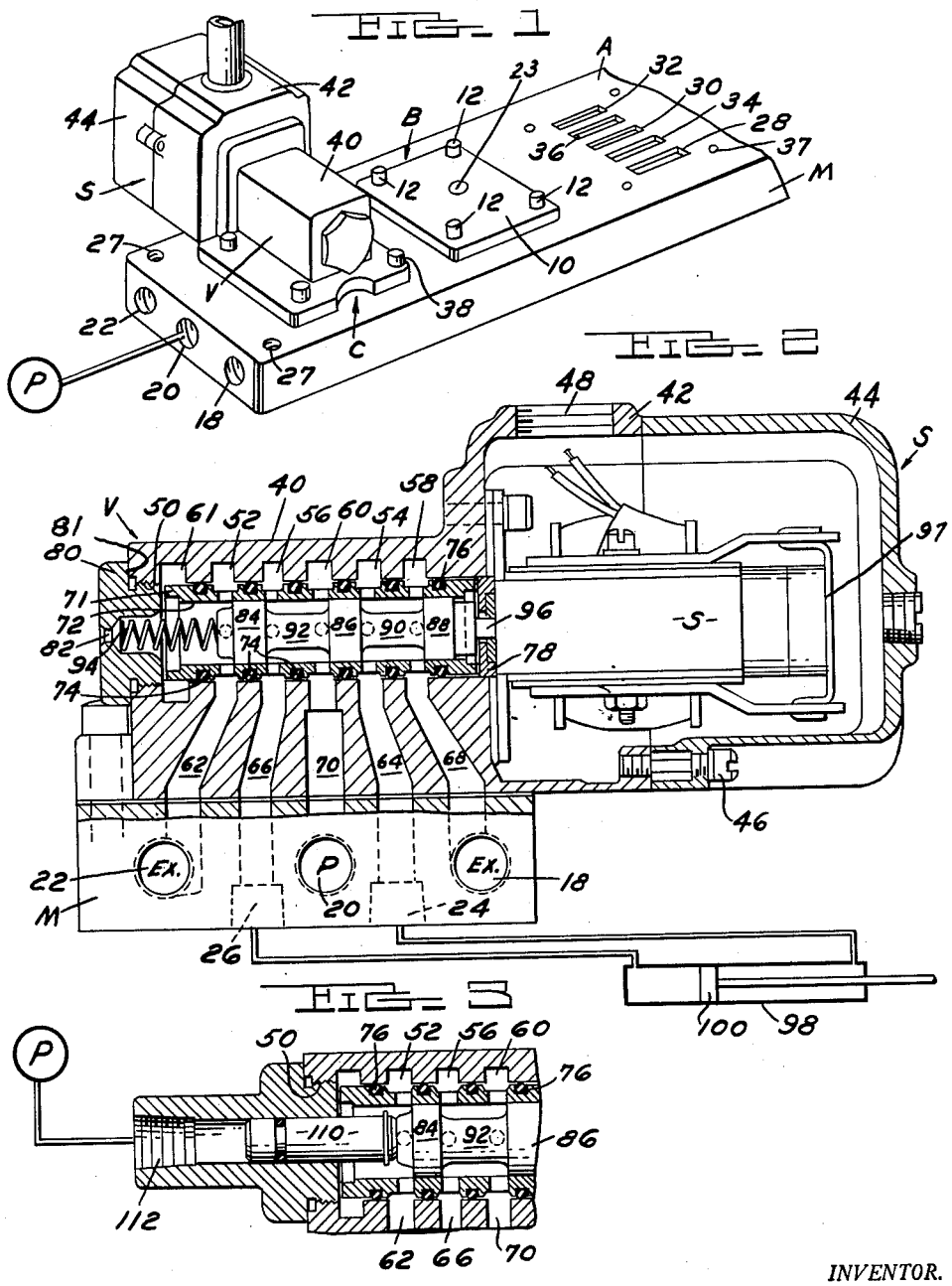
INVENTOR.
WILLIAM CARLS
BY
Barnes, Kisselle, Laughlin & Raisch
ATTORNEYS

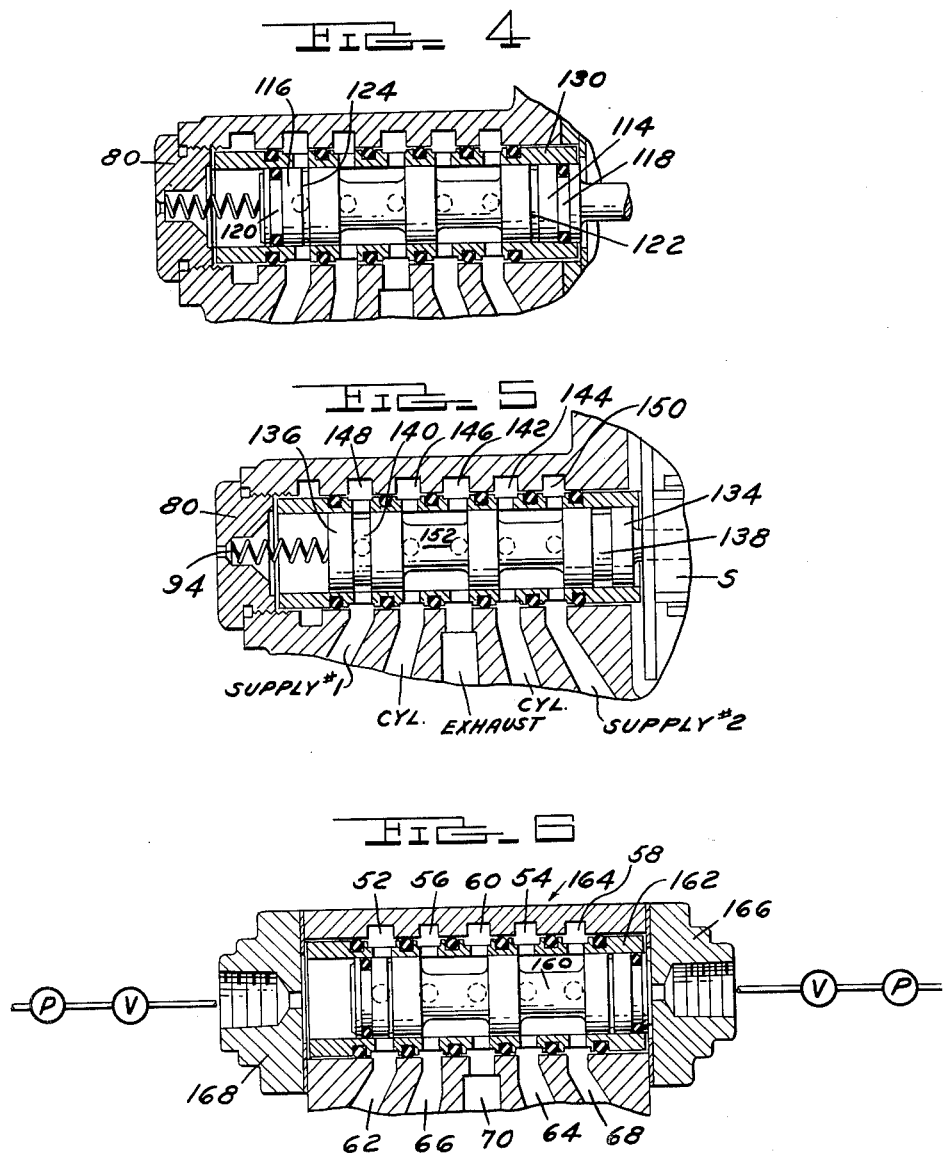

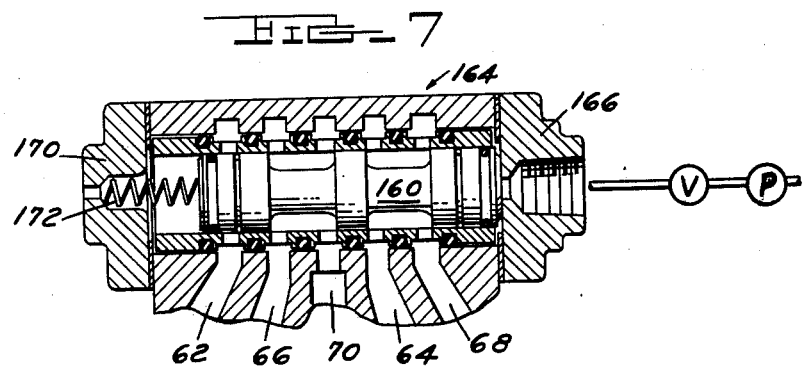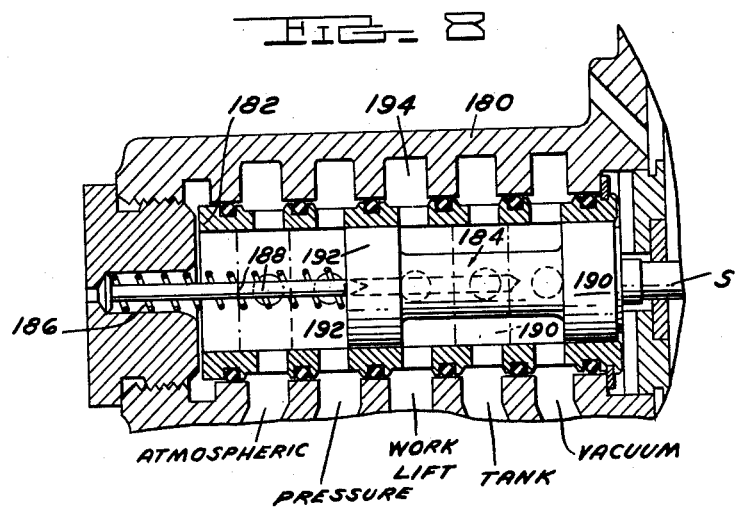

3,152,614
VALVE
William Carls, 106 S. Main St., Milford, Mich.
Filed Apr. 9, 1956, Ser. No. 576,990
11 Claims. (Cl. 137—625.69)

This invention relates to an air control valve and particularly to a valve for directing fluid to control apparatus such as cylinders and the like for machine tool operation and other industrial applications.

Briefly, the invention consists of the combination of a solenoid housing, a valve housing and a manifold support adapted for versatile mounting and application and also to the arrangement of a spool and sleeve valve combination which adapts itself to these respective housings.

Drawings accompany the disclosure, and the various views thereof may be briefly described as:

FIGURE 1, a perspective view of a manifold mount showing a valve in position.

FIGURE 2, a sectional view of a valve showing the relationship to the solenoid housing and the manifold mount.

FIGURE 3, a modified valve construction utilizing air biasing.

FIGURE 4, a modification of the valve for use in hydraulic applications.

FIGURE 5, a modification of the valve for use with dual supply of pressure.

FIGURE 6, a modification of the valve utilizing pressure control at both ends for actuation.

FIGURE 7, a modification of the valve utilizing pressure control at one end and spring return at the other.

FIGURE 8, a valve design for a special vacuum and pressure circuit.

Referring to the drawings, in FIGURE 1 a manifold M is shown having valve positions A, B and C. The valve position A is open, showing various ports which will be described; and valve position B is closed by plate 10 held in place by bolts 12. In valve position C is located a valve assembly V having a solenoid housing S.

The manifold M has three straight-through passages extending lengthwise, which can be identified as passages 18, 20 and 22. The central passage 20 is normally a supply passage, and the passages 18 and 22 are normally exhaust passages. However, the function of these passages can be changed, as will be described. A plug 23 in plate 10 permits tapping the pressure passage for auxiliary pilot control or air biasing.

Between the passages 18 and 20 and 22 are cylinder passages 24 and 26, which extend transversely through the plate with tapped openings in the bottom of the plate. In the corner of the manifold M are holes 27 for mounting the manifold. With reference to the top of the manifold as shown in position A, passages 18 and 22 open to the top of the manifold at 28 and 32 while the central passage 20 opens at 30.

The two cylinder ports 24 and 26 open at 34 and 36, these openings being elongate slots which are parallel across the manifold. Suitable tapped holes 37 serve to locate either the plate 10, which covers a station, or to locate a valve base for the valve V held in place by bolts 38.

As shown in FIGURE 2, the valve housing V has a main portion 40 for the valve and has an open-ended, enlarged portion 42 which forms part of the solenoid housing completed by a cap 44 held in place by captive bolts 46. Housing 42 is apertured at 48 for the passage of power into the solenoid designated at S. Thus, the cap 44 can be removed without disturbing the electrical connections.

The housing 40 has a main bore 50 provided with six spaced ports 52, 54, 56, 58, 60 and 61. Five of these ports lead downwardly to meet the openings in the manifold through respective passages 62, 64, 66, 68 and 70, as shown in FIGURE 2.

Within the bore 50 is a floating sleeve 71 having an inner bore 72. The outer surface of the sleeve 71 is spaced from the walls of bore 50 and provided with concentric grooves which correspond with the ports 52, 54, 56, 58, 60, respectively. The annular grooves in the sleeves 72 are ported to the interior of the sleeve, and between each of these annular grooves are annular recesses 74 for receiving resilient spacing and sealing rings 76, commonly known as O-rings, formed preferably of a synthetic, oil-resistant rubber. The clearance of sleeve 71 with the bore 50 depends on the size of the valve and in normal sizes ranges from .006 of an inch to .010 of an inch, varying as the diameter of the valve assembly increases.

To establish the sleeve diameter, the following procedure is recommended. Once the bore of the body is determined, then, for diameters from .000″ to 1.125″, multiply the bore diameter (B) by 1% × π. Subtract the result from the bore circumference and divide by π to obtain sleeve diameter.

For example:

(B) Bore = .750
Circumference = πB = 2.357
Diam. clearance = π × .01 × .750 = .02357
Sleeve diam. =

$$\frac{\text{circumference} - \text{D.C.}}{\pi} = \frac{2.357 - .02357}{\pi} = .742$$

For a diameter of 1.125 to 2.000″ use .7% in place of 1%, and for diameters 2.000 to 2.500″ use .5%.

The O-rings 76 create the necessary seal between the ports in the valve housing, the sleeve being positioned endwise between locator ring 78 at one end and a plug 80 screwed into the bore 50 at the other end, the plug 80 having an atmospheric opening 82. The plug has a stop flange 81 to limit the movement inward. The sleeve has about .010 of an inch clearance endwise so it cannot receive a binding pressure axially. This insures a floating position in all directions controlled by the resilience of the interposed O-rings.

The clearance between the spool and the housing allows expansion and contraction due to temperature changes without warping of the sleeve; and if the main housing V tends to be warped at all by reason of the fastening to an uneven base, it will not disturb the character of the bore 72 of the sleeve 71. Within the sleeve 71 is a valve spool composed of lands 84, 86 and 88 connected by restricted portions 90 and 92. A spring 94 recessed in cap 80 urges the valve to the right, as shown in FIGURE 2, and the solenoid acting through an armature shaft 96 actuates the valve to the left. A stop 97 ordinarily stops the motion of the solenoid armature. If this should fail, the valve itself will stop against ring 78.

The sleeve and the spool are preferably formed of a corrosion-resistant, high-carbon hardened steel, having the same co-efficient of expansion, and the parts are both hardened and ground, honed and lapped to a finish which is described as 4 to 6 micro finish. The fit between the parts ranges from 165 to 210 millionths of an inch as determined on an air gauge. The spring 94 is designed to be relatively long spring to give it a long life assuring that in any position it will not be overstressed.

With the arrangement of two exhaust ports 18 and 22, it is possible in connecting the valve to a double-ended cylinder to meter both sides of the cylinder, thus assuring full control of the piston movement if desired. Cylinder 98 is shown with piston 100 diagrammatically in FIGURE 2.

In FIGURE 2, the supply of air under pressure is furnished through passages 20 and 70 to port 60; and as the valve is shown, this will pass to the cylinder port 56 and passages 66 and 26, the cylinder passages 24, 64 and 54 being connected to the exhaust ports 58, 68 and 18. Shifting of the valve by the solenoid against the spring 94 will connect the pressure passage 70 to the cylinder passage 64 and will connect the cylinder passage 66 to the exhaust passage 62.

By operation of the solenoid, the valve spool can be shifted rapidly and positively to the two positions. It will be noted that the solenoid housing is supported independently of the base M so that the solenoid can be reached without disturbing the valve set-up, and it is also possible to service the valve from either side without disturbing the relationship of the valve housing to the manifold and without disturbing the pressure and cylinder connections.

The valve above disclosed is extremely versatile in its application. For example, in FIGURE 3, an air bias may be used instead of a spring. In this embodiment a piston 110 has one end bearing against the valve spool, as shown in FIGURE 3, and the other end exposed to an opening 112 which can be connected to a pump or other suitable pressure source. Thus, the piston is biased by air pressure to the left and will be moved against this air pressure by the solenoid action. A retaining ring holds piston 110 in place.

In FIGURE 4, a similar type of valve is shown for use especially in low-pressure hydraulic systems. The operation of this valve is the same as that shown in FIGURE 2, but the end spools 114 and 116 are provided with O-ring grooves and O-rings 118 and 120 to prevent what is called "slow leakage" or "weeping" as the valve is actuated.

The grooves 122 and 124 in these end spools serve to facilitate the lubrication of the valve in the sleeve 130 with this exception: the valve operates in the same manner as the air valve of FIGURE 2. In FIGURE 5 a valve is shown which can be utilized with a dual-pressure supply. The construction of this valve is almost identical with that of FIGURE 2 with the exception of the end spools 134 and 136, which are longer than the end spools of the embodiment of FIGURE 2 and which are provided with annular grooves 138 and 140 to facilitate the lubrication of the valve and the sleeve.

In this valve the exhaust is taken out through the central port 142. The cylinder ports 144 and 146 are on either side of the central exhaust port, and at each end of the valve are supply ports, the first supply being through port 148 and the second supply being through port 150. With this arrangement, it can be readily seen that a low pressure can be supplied through one end of a cylinder and a high pressure to the other end, each cylinder exhausting through the central port as the valve spool 152 is shifted.

In FIGURE 6 a modified construction is shown in which air pressure is used for actuation of the valve spool 160 to the desired control position. In FIGURE 7 a similar valve is shown with an end fitting 170 serving as a seat for a spring 172 so that the valve is a spring return valve when not actuated by pressure from a source through end fitting 166. The valve may be also used in a system utilizing a vacuum in a sub-atmospheric pressure, over-atmospheric pressure and atmospheric pressure. In FIGURE 8 there is shown an embodiment wherein the housing 180 contains a sleeve 182 in which is located a spool 184 spring biased by a long spring 186 supported by a pin 188. This device is especially used for the picking up of sheet metal plates with a vacuum cup and releasing the plates by putting pressure into the cup. Valve spool 184 has two end lands 190 and 192.

In the position shown, with the valve to the right, the work lift 194 is connected to the tank and also to the source of vacuum for sub-atmospheric pressure so that work may be lifted by reason of the vacuum in the work-lift pad. Shifting of the valve to the left moves the lands 190 and 192 to the dotted position shown, in which position the work lift is connected to pressure so that the vacuum is relieved and the work is deposited. Each end of the valve is connected to atmosphere; and during the lifting operation, the pressure source is connected also to atmosphere.

It will be seen that the various valves described above may be mounted on a manifold M having as many stations as required and that a great variety of operations can be accomplished with a single valve housing using different valve spools and various arrangements of pressure and exhaust connections.

In each case the valve sleeve is located either by the solenoid connection at one end and the atmospheric plug 80 at the other or by the other connections as shown in FIGURES 7 and 8. Also, in each case the contact surfaces between the ports in the housing are sealed by O-rings which have extremely long life due to the fact that there is no motion between the parts in operation. This, coupled with the unusual pre-fitting of the spools and sleeve, insures a valve that will operate almost indefinitely without being affected by the temperature of the housing or the fluids that pass through it.

The clearance between the sleeve and the housing is sufficient to compensate for any warping or change in dimension of the housing, and thus it is unnecessary to conform the co-efficient of expansion of the main housing with the sleeve and spool. Thus, the main housings can be made of aluminum castings; and the sleeve and spool can be formed of high-grade steel, reducing the weight and also the cost.

I claim:

1. An air control valve comprising, a housing having a bore and spaced annular ports along said bore for pressure and exhaust connections to a source of supply and a work motor, a sleeve of relatively hard, wear-resistant material inserted in said bore having annular bosses thereon spaced to register with the annular portions of the housing between said ports, said sleeve having a substantial clearance axially with said housing and also between its outer diameter and the inner diameter of the bore of said housing to provide a mechanical and thermal insulation space, said annular bosses having grooves for receiving O-rings and O-rings in said grooves extending outwardly from said housing to seal the space between said sleeve and said housing bore and thus create composite ports between said sleeve and said housing, a valve spool having a lapped fit therewith, and passages formed in said sleeve wherein said spool may direct fluid between said ports, depending on the position of said valve spool.

2. A device as defined in claim 1 in which one end of said bore in said housing is adapted to receive a pressure connection, and a pressure nipple in the end of said bore having an air-operated plunger for contacting and shifting said valve spool in the absence of actuation pressure from the other end of the spool.

3. A device as defined in claim 1 in which the valve spool has two widely spaced lands adapted to connect three of said ports together in one position and to block two other ports while connecting two other adjacent ports in a second position, and means at one end of said valve housing for spring biasing said valve spool, comprising, a plug for one end of said bore in said housing having an internal spring-sealing recess, a spring guide supported in said recess projecting into an aperture in said valve spool, and a spring seated at one end in said recess and at the other end in the recess end of said valve spool.

4. A pilot-operated valve comprising, a housing having a bore open at each end and provided with spaced annular grooves between the ends thereof, a sleeve having a valve bore adapted to be positioned in said housing bore in spaced relation to the walls of said housing bore, said sleeve having annular bosses spaced along its length positioned to contact those portions of the bore of the housing on each side of said spaced grooves, said annular bosses on said sleeve having annular grooves, and said O-rings comprising rings of resilient material having an outside diameter greater than the interior diameter of the bore of said housing to create composite ports of said grooves in co-operation with the sleeve, passages from one surface of said housing to each of said ports, connected to the interior of said sleeve through circumferentially spaced openings in said sleeve, a valve spool within said sleeve having lands spaced to connect said ports selectively, depending on the position of the spool, and a pressure connection at each end of said housing adapted to be sealed thereto to position said sleeve in the housing and to direct air under pressure selectively to one end of the housing to cause shifting of said spool within said sleeve.

5. An air control valve comprising, a housing having a bore and spaced interior annular lands and ports along said bore for pressure and exhaust connections to a source of supply and a work motor, a sleeve of relatively hard, wear-resistant material inserted in said bore having annular bosses thereon spaced to register with the annular lands of the housing between said ports, said sleeve having a substantial clearance between its outer diameter and the inner diameter of the bore of said housing to provide mechanical and thermal insulation space therebetween, said annular bosses having grooves for receiving O-rings, and O-rings in said grooves extending radially outward from said sleeve into said space to contact the annular lands of the bore of the housing and also to create composite ports between said sleeve and said housing, a valve spool having a lapped fit within said sleeve, passageways formed in said sleeve wherein said spool may direct fluid between said ports, depending on the position of the valve spool within the sleeve, means at each end of said bore positively positioned to confine said sleeve in said bore, said sleeve being dimensioned axially smaller than the distance between said confining means, wherein said sleeve is in a floating position within said bore on all surfaces.

6. A device as defined in claim 5 in which the diametrical clearance between the sleeve and the bore is predetermined between .006 and .010 of an inch, depending on the size of the valve.

7. A device as defined in claim 6 in which the diametrical clearance between the bore and the sleeve is determined as a percentage of the circumference of the bore, this being 1% for valves having a bore up to 1.125 inches.

8. A device as defined in claim 6 in which the diametrical clearance between the bore and the sleeve is determined as a percentage of the circumference of the bore, this being .7% for valves having a bore diameter from 1.125 to 2 inches.

9. A device as defined in claim 6 in which the diametrical clearance between the bore and the sleeve is determined as a percentage of the circumference of the bore, this being .5% for valves having a bore diameter from 2 to 2½ inches.

10. A device as defined in claim 5 in which a solenoid is operably associated with said valve spool to shift the same in the sleeve, means to provide a primary stop on said solenoid, and means to provide a secondary stop on said valve, said means comprising, an end portion on said valve adapted to contact one of the retaining means for said valve sleeve upon a predetermined travel of said valve in one direction toward the solenoid.

11. A device as defined in claim 5 in which the means to confine the valve sleeve in the bore comprise stops positioned positively relatively to the bore of said housing, one of said stops comprising, a threaded plug having a radial flange at the outer end thereof to limit its movement into said bore.

References Cited in the file of this patent

UNITED STATES PATENTS

| | | |
|---|---|---|
| 2,057,087 | DeMillar | Oct. 13, 1936 |
| 2,605,079 | Miller | July 29, 1952 |
| 2,767,689 | Moog | Oct. 23, 1956 |
| 2,781,782 | Gerwig | Feb. 19, 1957 |
| 2,791,237 | Berninger et al. | May 7, 1957 |